(12) United States Patent
Saji

(10) Patent No.: US 8,647,024 B2
(45) Date of Patent: Feb. 11, 2014

(54) CUTTING EDGE-REPLACEABLE CUTTING TOOL AND CUTTING INSERT FOR USE THEREIN

(75) Inventor: Ryuichi Saji, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 264 days.

(21) Appl. No.: 13/209,066

(22) Filed: Aug. 12, 2011

(65) Prior Publication Data

US 2011/0293381 A1 Dec. 1, 2011

Related U.S. Application Data

(63) Continuation of application No. PCT/JP2010/000818, filed on Feb. 10, 2010.

(30) Foreign Application Priority Data

Feb. 13, 2009 (JP) .................................. 2009-031698

(51) Int. Cl.
*B23C 5/22* (2006.01)
(52) U.S. Cl.
USPC .............................................. 407/48; 407/34
(58) Field of Classification Search
CPC .................................... B23C 5/20; B23C 5/22
USPC ............... 407/33, 34, 40, 47, 48, 51, 53, 103
See application file for complete search history.

(56) References Cited

U.S. PATENT DOCUMENTS

| | | | |
|---|---|---|---|
| 1,836,472 A * | 12/1931 | Jacobs | 407/38 |
| 5,059,068 A | 10/1991 | Scott | |
| 6,336,776 B1 * | 1/2002 | Noggle | 407/34 |
| 6,722,823 B1 | 4/2004 | De Souza et al. | |
| 2004/0265073 A1 * | 12/2004 | Hoefler et al. | 407/34 |
| 2007/0041797 A1 * | 2/2007 | Jang et al. | 407/40 |
| 2011/0013997 A1 * | 1/2011 | Pokolm | 407/48 |

FOREIGN PATENT DOCUMENTS

| | | | | |
|---|---|---|---|---|
| DE | 2044012 | | 3/1972 | |
| DE | 19600924 C1 * | | 3/1997 | ............... B23C 5/22 |
| JP | H07-251302 | | 10/1995 | |
| JP | 2000-190116 | | 7/2000 | |
| JP | 2002066826 A * | | 3/2002 | ............... B23C 5/22 |
| JP | 2005-118965 | | 5/2005 | |
| JP | 2007-522951 | | 8/2007 | |
| JP | 2007319986 A * | | 12/2007 | ............... B23C 5/22 |
| JP | 2008-80468 | | 4/2008 | |
| JP | 2004-345081 | | 12/2009 | |

OTHER PUBLICATIONS

International Search Report in PCT/JP2010/000818, dated Apr. 13, 2010.

(Continued)

*Primary Examiner* — Daniel Howell
*Assistant Examiner* — Ryan Rufo
(74) *Attorney, Agent, or Firm* — Womble Carlyle

(57) ABSTRACT

A cutting edge-replaceable cutting tool includes a tool body, and a cutting insert is removably installed on the tool body. The cutting tool-replaceable cutting tool includes an insert mounting seat formed on the tool body and on which the cutting insert is mounted, and a upper wall portion formed integrally with the tool body and overhanging the insert mounting seat.

12 Claims, 9 Drawing Sheets

(56) References Cited

OTHER PUBLICATIONS

Official Action dated Oct. 23, 2012 issued in Chinese counterpart application (No. 201080007614.2) with translation.

Official Action dated Oct. 28, 2011 issued in counterpart Japanese application No. 2010-550461 (with English Translation).

International Preliminary Report on Patentability (IPRP) dated Oct. 27, 2011 issued in counterpart PCT application No. PCT/JP2010/000818.

* cited by examiner

CUTTING EDGE-REPLACEABLE CUTTING TOOL AND CUTTING INSERT FOR USE THEREIN

CROSS-REFERENCE TO RELATED APPLICATIONS

This is a continuation of International Application No. PCT/JP2010/000818 filed Feb. 10, 2010 and published as WO 2010/092807, which claims the benefit of Japanese Patent Application No. 2009-031698, filed Feb. 13, 2009. The contents of the aforementioned applications are hereby incorporated by reference in their entirety.

BACKGROUND OF THE INVENTION

1. Field of the Invention

The present invention relates to a cutting edge-replaceable cutting tool adapted to removably mount cutting inserts on a tool body, and in particular, to a cutting edge-removable cutting tool that can be used for high-feed machining and a cutting insert for use therein.

2. Description of the Related Art

As a tool for use in cutting work of a mold or the like, a cutting edge-replaceable endmill is conventionally used in which a cutting insert is mechanically attached to a head of a generally cylindrical tool body adapted to be rotated around an axis thereof to form a cutting edge portion.

In such a cutting edge-replaceable cutting tool, the strength of the tool head required to fixedly support the insert is a major matter. Japanese Patent Laid-Open No. 2005-118965 states that the strength of the head is maintained by setting the ratio between a cross-sectional area defined by the width and thickness of the insert and a central mounting hole and a cross-sectional area defined by the height and thickness of the insert and the central mounting hole to fitting value within a predetermined range, and also setting the ratio between a thickness of a back metal in the tool head and the thickness of the insert to a predetermined value or greater.

However, a construction described in Japanese Patent Laid-Open No. 2005-118965 and adapted to increase the strength of the tool head is restricted in that there must be relations between components such as the ratio between the thickness of the back metal and the thickness of the insert, in a predetermined relation and this reduces the degree of freedom in design of the cutting tool and the insert.

SUMMARY OF THE INVENTION

The present invention has been developed in view of the above-described circumstances and an object of the present invention is to provide a cutting edge-replaceable cutting tool adapted to enable an increase in the strength of the tool head without reducing the degree of freedom of the design, as well as a cutting insert for use therein.

The present invention provides a cutting edge-replaceable cutting tool comprising a tool body, on which a cutting insert is removably installed, the cutting tool comprising an insert mounting seat formed on the tool body and on which the cutting insert is mounted and a upper wall portion formed integrally with the tool body and overhanging the insert mounting seat.

The tool body may comprise a plurality of insert mounting seats and a plurality of upper wall portions so as to allow a plurality of cutting inserts to be mounted on the tool body, and in the upper wall portion overhanging the insert mounting seat another insert mounting seat may be formed thereon adjacent to the insert mounting seat.

The upper wall portion may cover at least a part of the cutting insert when the cutting insert is mounted on the insert mounting seat.

The upper wall portion may be formed such that an amount by which the upper wall portion overhangs the insert mounting seat on a base end side thereof is larger than an amount by which the upper wall portion overhangs the insert mounting seat on a leading end side thereof.

A cutting edge-replaceable cutting tool according to an aspect of the present invention may comprise a screw hole formed at the insert mounting seat, a mounting screw being screwed into the screw hole through a mounting hole in the cutting insert when the cutting insert is mounted on the insert mounting seat and the upper wall portion may be shaped so as not to hinder screwing of the mounting screw into the screw hole.

The insert mounting seat may include a bottom wall surface, and a side wall surface and an end wall surface both extending to be at a right angle to the bottom wall surface and the upper wall surface extending to be at a right angle to both the side wall surface and the end wall surface and opposite the bottom wall surface may be formed in the upper wall portion.

A cutting edge-replaceable cutting tool according to an aspect of the present invention may comprise a setscrew hole formed to penetrate the upper wall portion toward the insert mounting seat, and when the cutting insert is mounted on the insert mounting seat, a setscrew may be screwed into the setscrew hole such that the cutting insert is pressed against the insert mounting seat.

The present invention provides a cutting insert for use in the cutting edge-replaceable cutting tool as described above. The cutting insert according to the present invention comprises two opposite end surfaces and a circumferential side surface extending between the two end surfaces, and the circumferential side surface of the cutting insert comprises an abutting surface that is able to be brought into contact with a surface of the insert mounting seat when the cutting insert is mounted on the insert mounting seat, and a marginal ridge portion of the abutting surface may be chamfered.

Further features of the present invention will become apparent from the following description of exemplary embodiments (with reference to the attached drawings).

DESCRIPTION OF THE EMBODIMENTS

A cutting edge-replaceable cutting tool and a cutting insert for use therein according to the present invention will be described based on certain embodiments. A first embodiment of the cutting edge-replaceable endmill according to the present invention will be described based on FIG. 1 to FIG. 6.

Figure 1:
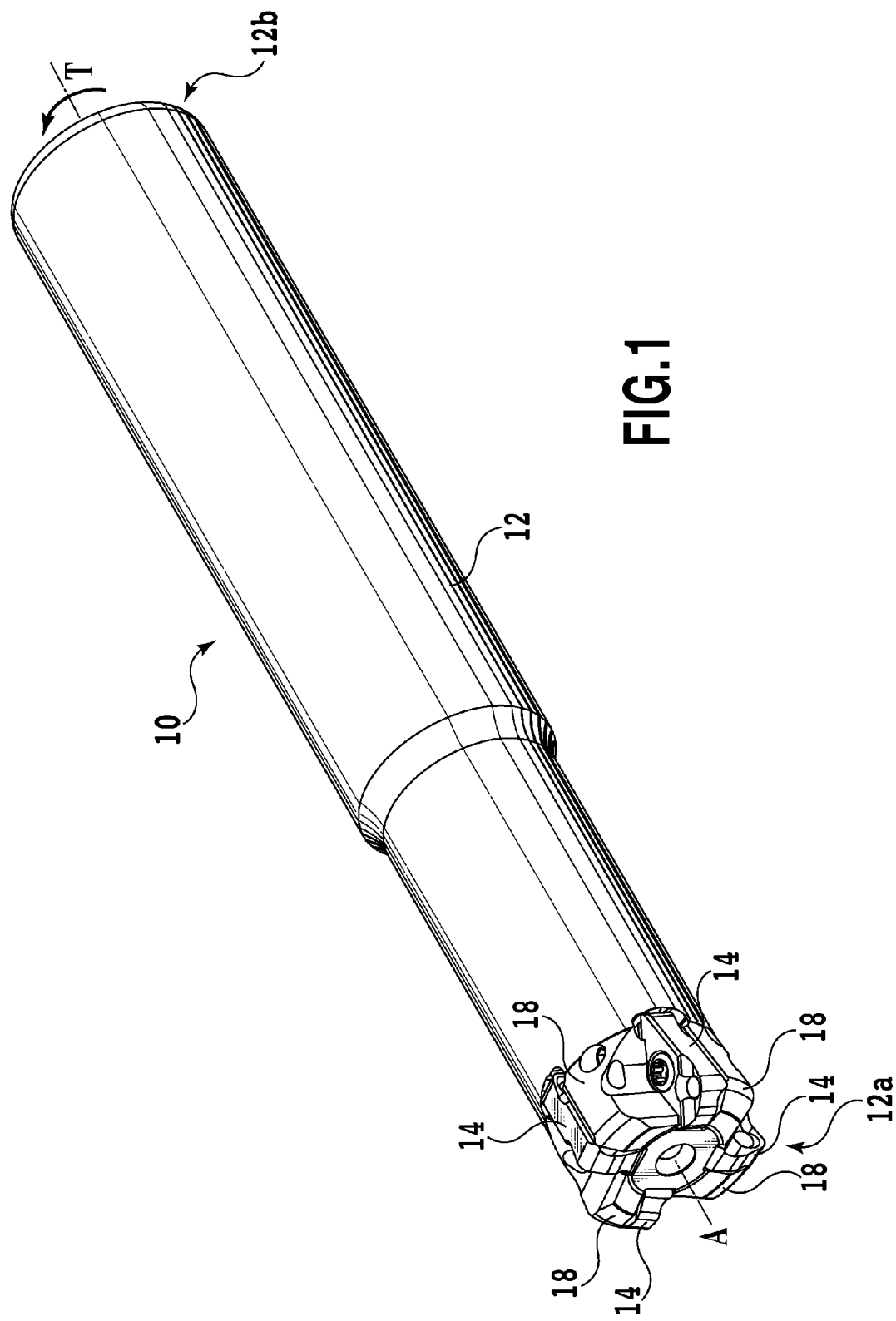
FIG. 1 is a perspective view showing a cutting edge-replaceable endmill according to an embodiment of the present invention.

FIG. 1 is a perspective view showing a cutting edge-replaceable endmill according to an embodiment of the present invention. As shown in FIG. 1, a cutting edge-replaceable endmill 10 according to the present embodiment can be rotated around an axis A extending from a leading end side to a base end side ("rear end side") thereof. The cutting edge-replaceable endmill 10 includes an endmill body 12 serving as a tool body, and at the leading portion thereof four cutting inserts 14 are removably installed. Each of the cutting inserts 14 forming an edge portion is mounted to the leading end 12a of the endmill body 12 by a mounting screw as described below. The cutting edge-replaceable cutting tool according to the present invention is not limited to the provision of a plurality of cutting inserts and can be adapted to include a single cutting insert.

The endmill main body 12 is generally cylindrical and is formed of high-speed steel, tool steel, alloy steel, stainless steel, cemented carbide, or the like. The surface of the endmill body 12 is subjected to an anticorrosion treatment (black oxide finish) or a hardening treatment (nitriding or hard plating), or the like, if required.

Figure 2:
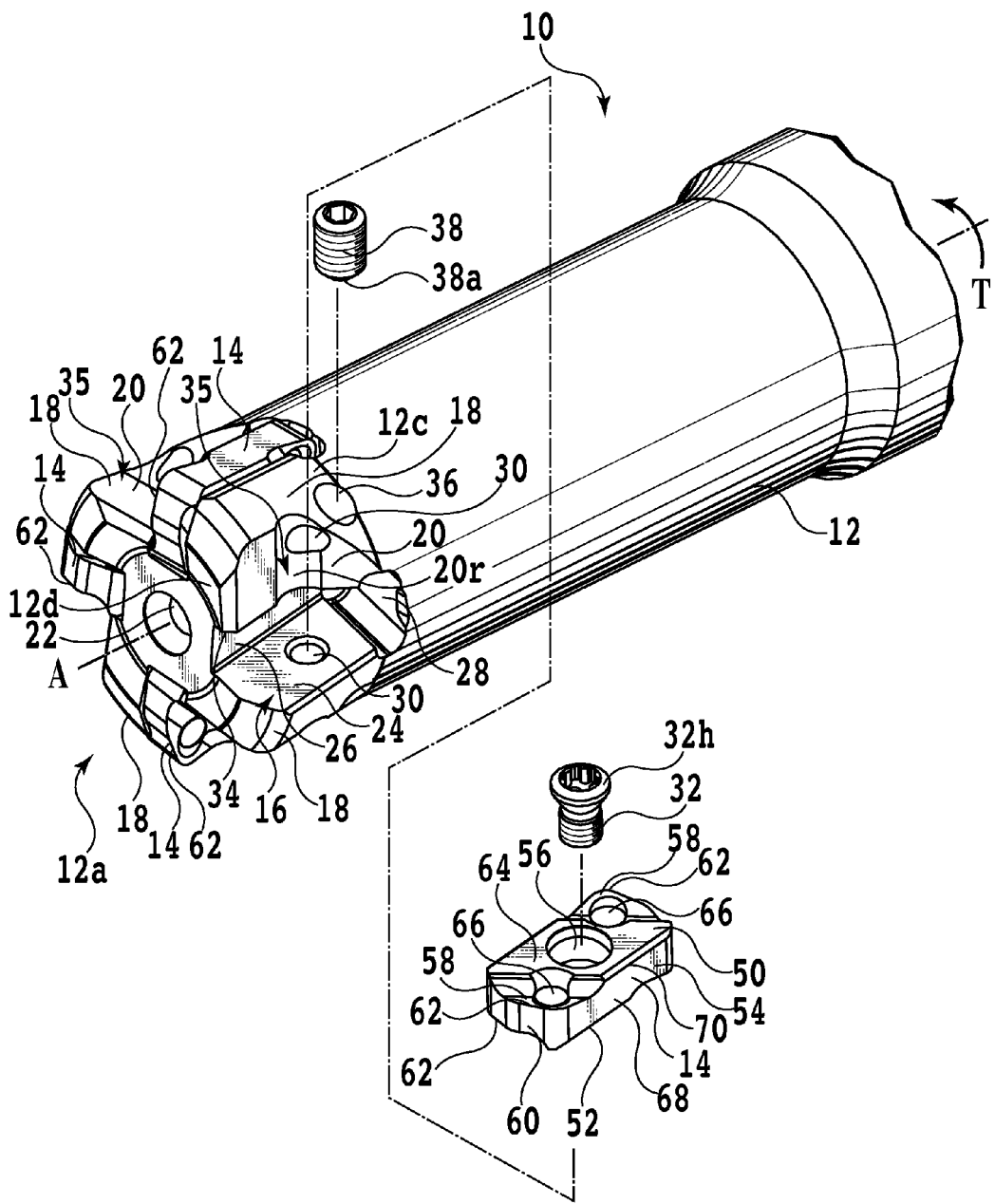
FIG. 2 is an exploded perspective view showing the structure of a leading end of the cutting edge-replaceable endmill in FIG. 1.

As shown in FIG. 2, four insert mounting seats 16 are formed at the head 12a of the endmill body 12 so that a cutting insert 14 can be mounted on each of the insert mounting seats 16. Moreover, upper wall portions 18 are provided so as to overhang the respective insert mounting seats 16. Each of the upper wall portions 18 is formed integrally with the endmill body 12. The upper wall portion 18 is provided for each of the insert mounting seats 16. Four insert mounting seats 16 are provided in the circumferential direction of the endmill body 12 at substantially equal intervals and four upper wall portions 18 are also provided in the circumferential direction of the endmill body 12 at substantially equal intervals. However, the numbers of the insert mounting seats 16 and the upper wall portions 18 may vary. Here, a head 12d of the endmill body 12 has a diameter of 20 mm.

Furthermore, a through-hole 22 is pierced in the endmill body 12 in such a way as to extend along the axis A from the tool head 12a to its base end 12b; a fluid is ejected through the through-hole 22. When a workpiece is machined using the cutting edge-replaceable endmill 10, an externally supplied cutting fluid, air, a mixed mist of a cutting fluid and air, or the like can be ejected from the tool head of the cutting edge-replaceable endmill 10 through the through-hole 22.

Figure 4:
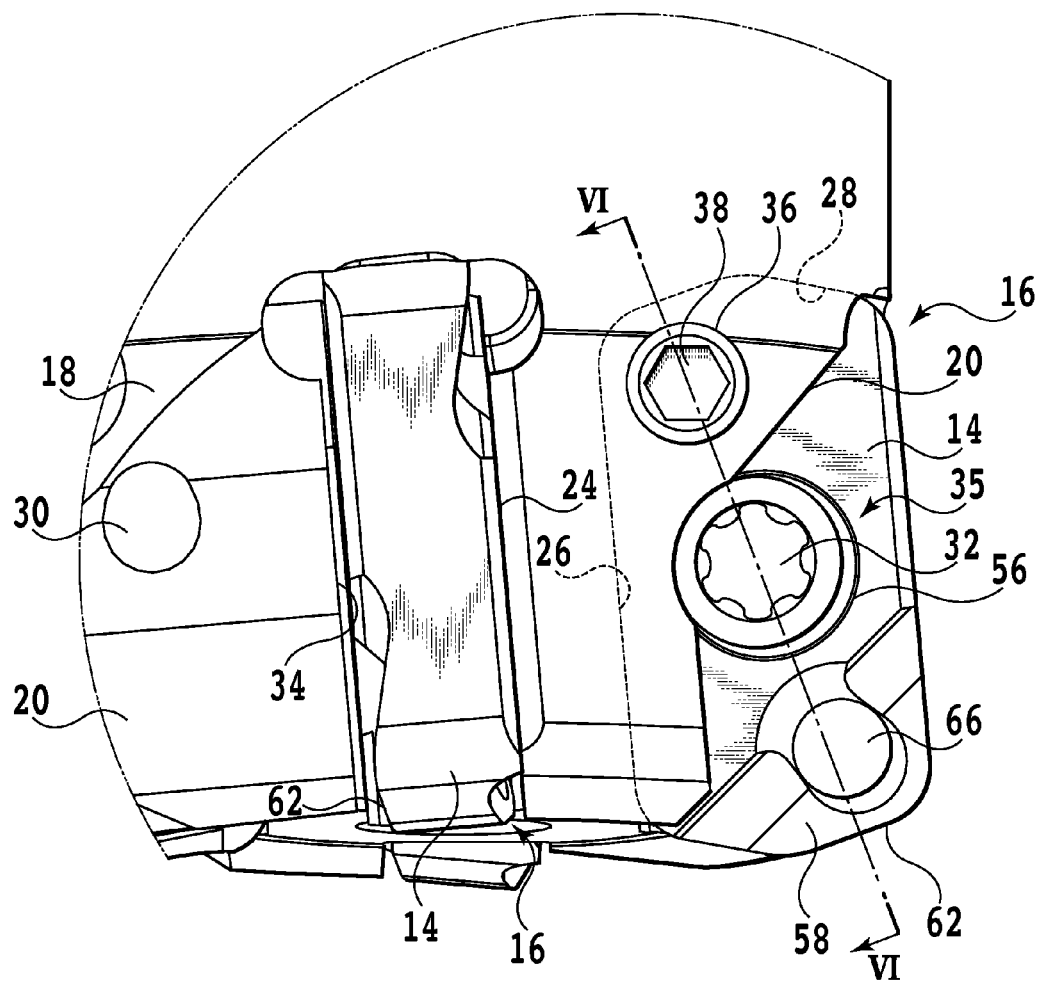
FIG. 4 is an enlarged diagram of a range enclosed by a dotted line in FIG. 3.

As shown in FIGS. 2 and 4, the insert mounting seat 16 includes a bottom wall surface 24, and a side wall surface 26 and an end wall surface 28 each extending at a right angle to the bottom wall surface 24 (extending upright from the bottom wall surface 24). The bottom wall surface 24 is flat and parallel to a plane containing the axis A. The side wall surface 26 is formed to face toward the outer circumferential side of the tool. Furthermore, the end wall surface 28 is formed to cross the side wall surfaces 26 and to face toward the tool leading end. A screw hole 30 is pierced in a central portion of the bottom wall surface 24. A mounting screw 32 can be screwed into the screw hole 30.

In connection with this, as described above, the endmill body 12 is provided with the upper wall portion 18 overhanging the insert mounting seat 16. The upper wall portion 18 is provided for the insert mounting seat 16 and includes a upper wall surface 34 located opposite the bottom wall surface 24. The upper wall surface 34 is located opposite (i.e., faces) the bottom wall surface 24 and extends at right angles to the side wall surface 26 and end wall surface 28 of the insert mounting seat 16. The upper wall portion 18 constructed as described above covers at least a part of the cutting insert 14 when the cutting insert 14 is mounted on the insert mounting seat 16.

The upper wall portion 18 is formed such that the amount by which the upper wall portion 18 overhangs the insert mounting seat 16 increases from the leading end to the base end of the upper wall portion 18. That is, the upper wall portion 18 is formed such that the amount by which the upper wall portion 18 overhangs the insert mounting seat 16 on the base end side thereof is larger than that by which the upper wall portion 18 overhangs the insert mounting seat on the leading end side thereof.

Figure 5:
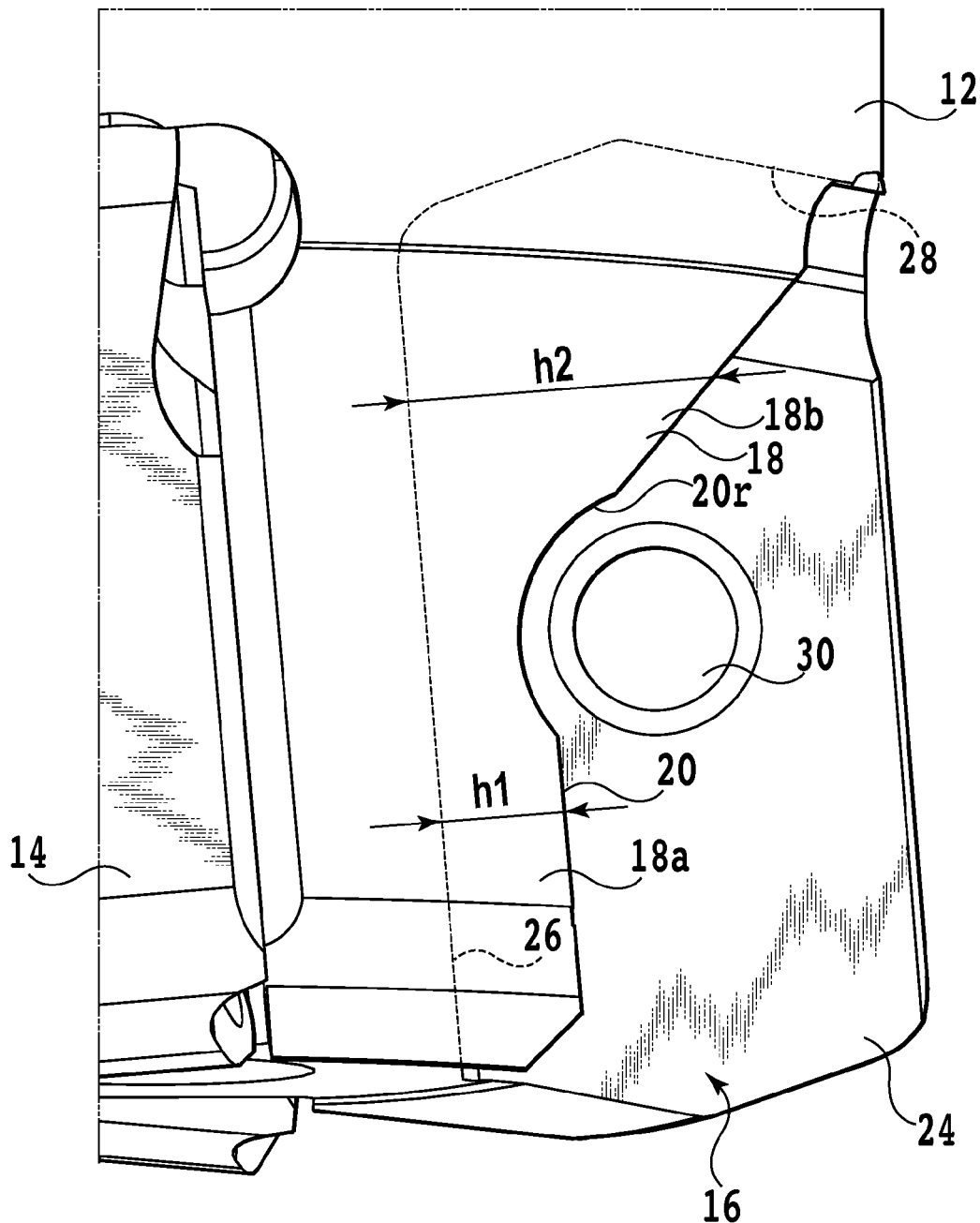
FIG. 5 is an enlarged diagram of a part of the leading end of the cutting edge-replaceable endmill in FIG. 2.
Figure 6:
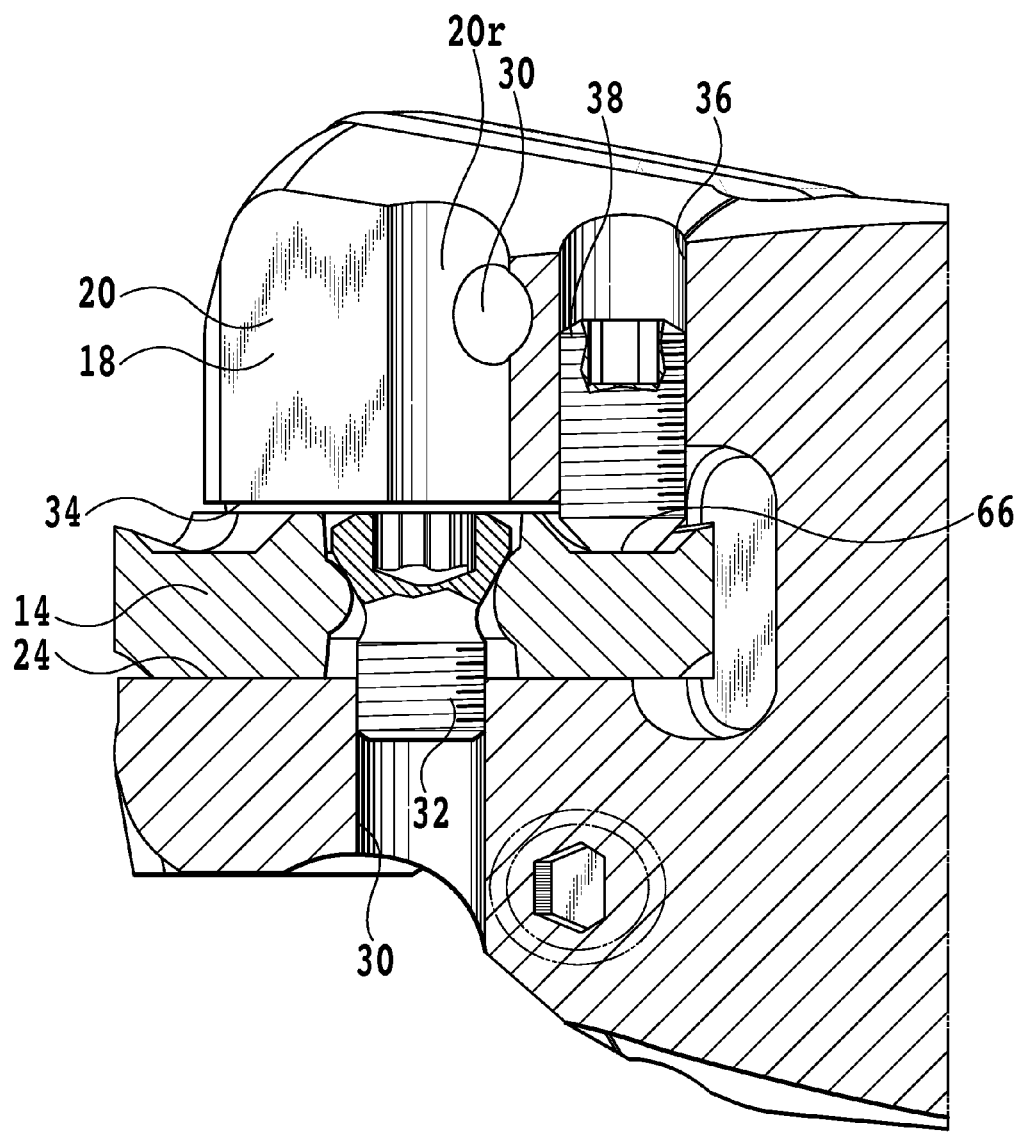
FIG. 6 is a cross-sectional view taken along line VI-VI in FIG. 4 and showing a part of the leading end of the cutting edge-replaceable endmill shown in FIG. 4, the part being obtained by cutting the leading end along a plane containing the axes of a mounting screw and a setscrew.

Here, specifically, as shown in FIG. 5, a leading end 18a of the upper wall portion 18 corresponding to a portion between a leading end side and a central portion of the upper wall portion 18 is formed so as to overhang from the side wall surface 26 of the insert mounting seat 16 toward the outer circumferential side of the tool by a substantially constant amount. Furthermore, a base end 18b of the upper wall portion 18 corresponding to a portion between the central portion and a base end side of the upper wall portion 18 is formed so as to overhang from the side wall surface 26 of the upper wall portion 18 toward the outer circumference of the tool by an amount increasing progressively from the leading end side toward the base end side.

Additionally, the base end 18b of the upper wall portion 18 is formed so as to overhang from the end wall surface 28 toward the tool leading end side. For example, the overhang amount h1 by which the upper wall portion 18 overhangs on the tool leading end side may be set about one-fifth to one-third of the width of the bottom wall surface 24 and is here set to about 1.5 mm. Furthermore, the overhang amount h2 by which the upper wall portion 18 overhangs on the tool base end side is set larger than the overhang amount h1 on the tool leading end side and the upper wall portion 18 is set so as to overhang, at the terminal end thereof near the end wall 28, by an amount substantially equal to the width of the bottom wall surface 24.

Figure 3:
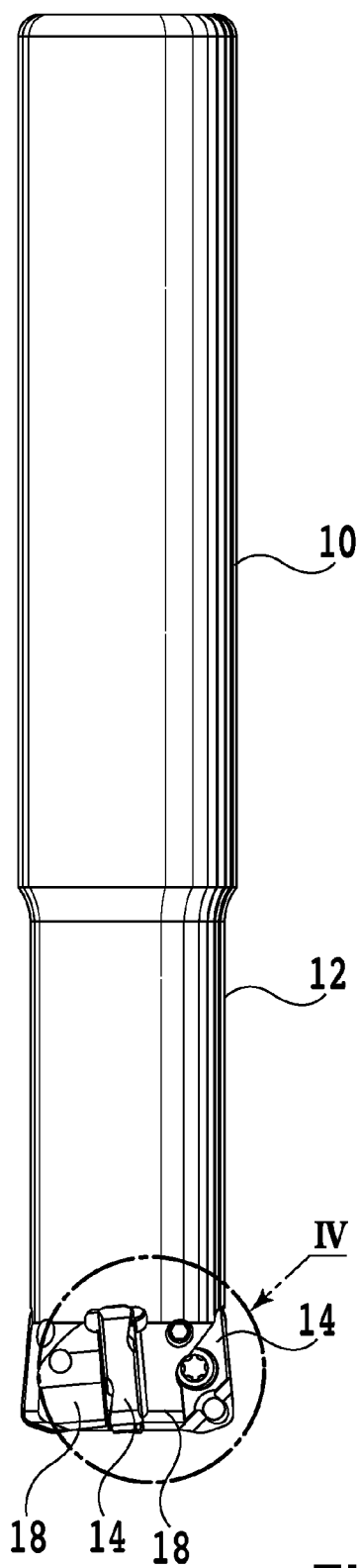
FIG. 3 is a plan view of the cutting edge-replaceable endmill shown in FIG. 1.

The upper wall portion 18 constructed as described above includes a side surface 20 facing toward the outer circumferential side of the tool. The upper wall portion 18, particularly the side surface 20 thereof, defines a chip pocket 35. The chip pocket 35 is shaped so as to facilitate generation, accommodation, and discharge of chips, particularly discharge of chips. The chip pocket 35 is formed so as to be recessed from an outer circumferential portion toward an inner circumferential portion of the endmill body 12 over a distance substantially equal to the length of the insert mounting seat and, in particular, is formed such that the amount of the recess is larger on the leading end side thereof. As shown in FIG. 3 to FIG. 5, the side surface 20 is formed to be at a right angle to the bottom wall surface 24 of the insert mounting seat 16. As shown in FIG. 5, a recess portion 20r is formed in a central portion of the side surface 20 to prevent a head portion 32h of the mounting screw 32 from coming into contact with the side surface 20 during operation of the mounting screw 32. That is, the upper wall portion 18 is shaped so as not to hinder the mounting screw 32 from being screwing into the screw hole 30. Avoiding hindering the screwing means that for example, the upper wall portion 18 avoids at least being present on the extension of a path along which the screw advances, so as not to interrupt an operation that uses a tool, for example, a driver. The recess portion 20r can be referred to as an undercut portion.

The upper wall portion 18 will be described in further detail. Any one upper wall portion 18 overhangs corresponding one insert mounting seat 16 and can thus cover at least a part of the cutting insert 14 on the insert mounting seat 16. In the upper wall portion 18, another insert mounting seat 16 circumferentially adjacent to the corresponding one insert mounting seat 16 is formed thereon. In other words, each of the upper wall portions 18 of the endmill body 12 is formed by extending the bottom wall surface 24 of one of the insert mounting seats 16 of the endmill body 12 to above the adjacent insert mounting seat 16. Each of the upper wall portions 18 constructed as described above is a portion surrounded by the bottom wall surface 24 of one insert mounting seat 16, the upper wall surface 34 with respect to a circumferentially adjacent mounting seat 16 positioned behind the bottom wall surface 24 which is in the direction T of rotation of the tool, the side surface 20, an outer peripheral surface 12c of the endmill body 12, and a leading end surface 12d of the endmill body 12. Thus, the upper wall portion 18 constructed as described above forms back metal adapted to allow the cutting insert 14 to be fixedly supported on the insert mounting seat 16 adjacent to and different from the one which the upper wall portion 18 overhangs. The upper wall portion 18 overhangs the insert mounting seat 16 as described above. The back metal is formed such that the thickness of the back metal, that is, the distance from the bottom wall surface 24 of the insert mounting seat to side surface 20, is constant between the leading end side and the central portion and increases progressively from the central portion toward the base end side.

Furthermore, a setscrew hole 36 is formed on the tool base end side of the upper wall portion 18 so as to penetrate the upper wall portion 18 from the outer circumferential portion 12c of the endmill body 12 toward the insert mounting seat 16. A setscrew 38 can be screwed into the setscrew hole 36.

FIG. 2 shows the cutting insert 14 replaceably mounted on the endmill body 12 constructed as described above. The cutting insert 14 is formed as what is called a negative type insert both sides of which can be used by being mounted on the insert mounting seat 16 after reversing the insert. The cutting insert 14 has a generally rectangular tabular shape. The cutting insert 14 includes an upper surface 50 and a lower surface 52 which serve as two end surfaces facing the opposite directions, the lower surface facing the direction opposite to that faced by the upper surface 50, and a circumferential side surface 54 extending between the upper surface 50 and the lower surface 52. The upper surface 50 and the lower surface 52 are substantially orthogonal to the circumferential side surface 54, respectively. The upper surface 50 and the lower surface 52 may be used as the lower surface and the upper surface, respectively. Here, for easy understanding of the cutting insert 14, the description of the cutting insert 14 is based on the positional relationship illustrated in FIG. 2. The terms "upper" and "lower" do not limit the direction and construction of the cutting insert 14. In the cutting insert 14, a mounting hole 56 is formed therein so as to penetrate the cutting insert 14 in the thickness direction thereof, that is, between upper surface 50 and the lower surface 52. The shapes of the upper surface 50 and the lower surface 52 are symmetric. The cutting insert 14 is formed of cemented carbide, cermet, ceramic, or the like.

As shown in FIG. 2, the cutting insert 14 includes rake faces 58, flank faces 60, and cutting edges 62 each formed at an intersection ridge portion between the rake face 58 and the flank face 60. Two rake faces 58 are formed on each of the upper and lower surfaces 50 and 52 which are generally rectangular. Each of the flank faces 60 is formed on the circumferential side surface 54 at a right angle to the corresponding rake face 58. Two cutting edges 62 are provided on each of the upper and lower surfaces 50 and 52 of the cutting insert 14. The cutting edges 62 are arranged so as to be rotationally symmetric in a plan view as seen from a direction opposite to the upper and lower surfaces and are also arranged so as to exhibit the same shapes when the insert body is reversed. The present invention is not limited to the shown plurality of cutting edges provided on the insert and one or more cutting edges may be provided on the insert. Furthermore, the cutting edges need not be provided on both surfaces of the insert but may be provided exclusively on one surface.

Furthermore, a seat surface (abutting surface) 64 formed of a flat surface is provided on each of the upper and lower surfaces 50 and 52 of the cutting insert 14. The cutting insert 14 is positioned with respect to the insert mounting seat 16 so that the seat surface 64 is mounted on the bottom wall surface 24 of the insert mounting seat 16. The mounting screw 32 is inserted into the mounting hole 56 in the cutting insert 14. Furthermore, engagement holes 66 shaped like circular truncated cones are each formed in the upper and lower surfaces of the cutting insert 14 close to a corresponding corner of the surfaces. A leading end 38a of the setscrew 38 can be engaged with each of the engagement holes 66.

Furthermore, abutting surfaces 68 each formed of a flat surface are provided on the circumferential side surface 54 of the cutting insert 14. When the cutting insert 14 is mounted on the insert mounting seat 16, the abutting contact surface 68 can come into contact with the side wall surface 26 of the insert mounting seat 16. The end edges of the abutting contact surface 68, that is, the marginal ridge portion thereof, are chamfered. Such portions 70 subjected to chamfering can be hereinafter referred to as chamfered portions. The chamfered portions 70 are, for example, formed of planar chamfers with an angle of chamfer of 45° and a width of chamber of 0.2 to 1.0 mm.

Additionally, a chip breaker adapted to break chips outflowing on cutting into appropriate small pieces or the like is applied to the rake face 58 of the cutting insert 14

When the cutting insert 14 constructed as described above is mounted on the insert mounting seat 16, one cutting edge 62 arranged on the outer circumferential side of head of the endmill body 12 can be used for cutting work. If this cutting edge 62 is used for cutting or the like and damaged, the cutting insert 14 is rotated around the central axis of the mounting hole 56 or reversed. This allows the cutting edge 62 arranged on the outer circumferential side of the head of the endmill body 12 to be replaced with the other cutting edge 62. In this manner, the cutting insert 14 is indexable.

As the mounting screw 32, a common Phillips-head screw, pan head screw or the like may be used. Furthermore, as the setscrew 38, for example, a flat point screw with the leading end 38a shaped like a generally circular truncated cone may be used.

The operation of the cutting edge-replaceable endmill 10 constructed as described according to the present embodiment will be described below.

In the cutting edge-replaceable endmill 10 according to the present embodiment, the cutting insert 14 is inserted in the insert mounting seat 16 so as to be impacted in (so as to come into abutting contact with) the side wall surface 26 and end wall surface 28 of the insert mounting seat 16. Then, with one of the seat surfaces 64 seated on the bottom wall surface 24 of the insert mounting seat 16, the mounting screw 32 is screwed into the screw hole 30 through the mounting hole 56 in the cutting insert 14. Thus, the cutting insert 14, serving as an edge portion, is mounted on the insert mounting seat 16 of the endmill body 12.

Then, the base end 12b of the endmill body 12 is mounted to a spindle of a machine tool via a holder. The cutting edge-replaceable endmill 10 is fed in a direction transverse to the axis A in contact with a workpiece such as steel fixed on a table of the machine tool, while being rotated around the axis A in a rotational direction shown by reference character T in the relevant figures. Thus, machine parts and the like typified by molds can be cut using the cutting edge-replaceable endmill 10.

If the cutting edge 62 of the cutting insert 14 arranged on the outer circumferential side of head of the cutting edge-replaceable endmill 10 used is damaged in conjunction with cutting, the cutting insert 14 is temporarily removed from the cutting edge-replaceable endmill 10, turned around, and mounted to the cutting edge-replaceable endmill 10 again. Specifically, the cutting insert 14 is turned around by being rotated around the central axis of the mounting hole 56 or reversed. Thus, the usable cutting edge 62 can be replaced with the unused cutting edge 62. Hence, cutting can be continued using the cutting insert 14.

Furthermore, as described above, the upper wall portion 18 forming the back metal overhangs the insert mounting seat 16, and thus the thickness of the back metal can be increased by an amount equal to the overhang amount by which the upper wall portion 18 overhangs the insert mounting seat 16. Hence, the strength and rigidity of the tool head are improved. This construction also exerts the following effect. When, in order to increase the efficiency of cutting, high-feed cutting with the feed speed of the cutting edge-replaceable endmill 10 increased is carried out by increasing the amount by which each cutting insert 14 is fed, possible chatter vibration can be inhibited even if a heavy load is placed on the tool. As a result, even if it is used for high-feed cutting, possible damage to the cutting edge 62, possible breakage of the edge portion, possible breakage of the tool, and the like can be prevented, thus enabling an increase in the tool life. This also allows the quality of a machining surface to be improved.

Furthermore, the cutting edge-replaceable endmill 10 according to the present embodiment includes the upper wall portion 18 and allows the strength of the tool head to be improved compared to the conventional endmill without the upper wall portion 18. This enables an increase in the number of insert mounting seats 16 formed on the endmill body 12. As a result, the number of the cutting inserts 14 (the number of the cutting edges) installed on the endmill body 12 can be increased to further increase the feed speed of the cutting edge-replaceable endmill 10, thus further enhancing the efficiency of cutting.

Additionally, when the cutting insert 14 is mounted on the insert mounting seat 16, a part of the cutting insert 14 is covered with the upper wall portion 18. Specifically, the cutting insert 14 is mounted on the insert mounting seat 16 such that the non-operative cutting edge 62, rake face 58, and flank face 60 which are different from those arranged on the outer circumferential side of head of the endmill body 12 and used for cutting are surrounded by the bottom wall surface 24, side wall surface 26, and end wall surface 28 of the insert mounting seat 16 and the upper wall surface 34 of the upper wall portion 18. Thus, even if thick chips flow out when high-feed cutting is carried out, the cutting edge 62 and other components which are not involved in the cutting can be prevented from being damaged as a result of scratching or collision of chips. In particular, the upper wall portion 18 completely covers and protects the unused cutting edge 62 arranged at a position such that the unused cutting edge 62 and the cutting edge 62 in use are rotationally symmetric with respect to the center axis of the hole 56. This prevents the unused cutting edge 62 from being damaged during single use of the cutting insert 14. Therefore, all the cutting edges 62 of each cutting insert 14 can be reliably used, thus making the endmill 10 and the cutting inserts 14 economically excellent.

In addition, with the cutting insert 14 positioned in an insert pocket defined by the insert mounting seat 16 and the upper wall portion 18 such that movement of the cutting insert 14 is limited to some degree, an operator can screw the mounting screw 32 into the hole 30 via the hole 56 in the cutting insert 14. Thus, even if for example, the cutting insert is small in size, the operator is prevented from dropping the cutting insert 14 or the mounting screw 32 during mounting of the cutting insert. Hence, when the cutting edge 62 is replaced or the cutting insert 14 is replaced, the endmill 10 is excellent in the operability of the cutting insert 14 and the mounting screw 32.

Furthermore, in the endmill 10, at the base end of the upper wall portion 18, the overhang amount of the upper wall portion 18 is increased to enhance the strength of the leading end of the tool. The overhang amount of the upper wall portion 18 is set smaller between the leading end and central portion of the upper wall portion 18 to ensure a sufficient volume for the chip pocket. Thus, in the endmill 10, excellent characteristic for disposing of chips can be acquired, with the strength of leading end of the tool and the like improved.

Additionally, the bottom wall surface 24 of the insert mounting seat 16 and the upper wall surface 34 can be parallel to the same plane containing the axis A, and the insert mounting seat 16 and the upper wall surface 34 are provided such that the side wall surface 26 and the end wall surface 28 are at right angles to the bottom wall surface 24 and the upper wall surface 34. Thus, the insert mounting seats 16 can be machined at a time from a tool diameter direction at a right angle to the axis A. Hence, the endmill body 12 can be easily manufactured in a short time. Consequently, the shape of the upper wall portion 18 can also be freely set. Moreover, the side surface 20 of the upper wall portion 18 is provided to be at a right angle to the bottom wall surface 24 and upper wall surface 34 of the insert mounting seat 16, and this prevents the direction in which the insert mounting seat 16 is machined from interfering with the direction in which the chip pocket is machined. As a result, the shape of the chip pocket can also be freely set.

Furthermore, according to the cutting edge-replaceable endmill 10 according to the present embodiment, the setscrew hole 36 is formed in the upper wall portion 18 of the endmill body 12, and in the cutting insert 14 the engagement hole 66 adapted to engage with the leading end 38a of the setscrew 38 is provided. Thus, the cutting insert 14 is appropriately pressed toward the bottom wall surface 24 of the insert mounting seat 16 by using the mounting screw 32 to mount the cutting insert 14 on the insert mounting seat 16, and screwing the setscrew 38 into the set screw hole 36 to engage the leading end 38a of the setscrew 38 with the engagement hole 66 in the cutting insert 14. Hence, the pressing force increases to bring the seat surface 64 of the cutting insert 14 into tight contact with the bottom wall surface 24 of the insert mounting seat 16. Consequently, the cutting insert 14 is firmly fixed to the endmill body 12. This prevents the following situation even during high-feed cutting with a heavy load placed on the tool: the cutting insert 14 rises from the bottom wall surface 24 of the insert mounting seat 16 and is thus loosened or displaced from the bottom wall surface 24. This enables prevention of, for example, possible chatter vibration or damage to the cutting edge 62 during cutting caused by the insufficient mounting rigidity of the cutting insert 14.

Furthermore, in the cutting edge-replaceable endmill 10 according to the present embodiment, the chip pocket 35 is formed so as to be recessed from the outer circumferential portion to inner portion of the endmill body 12, particularly such that the amount of the recess is larger on the leading end side of the endmill body 12. Thus, a sufficient space is provided in the direction in which chips flow out, allowing excellent characteristic for disposing of chips to be acquired. Additionally, a space is provided above the screw hole 30, preventing the upper wall portion 18 from being an obstacle to mount and demount the mounting screw 32. In addition, the upper wall portion 18 is provided with the recess portion 20*r*, making the endmill 10 excellent in the operability of the mounting screw 32.

Moreover, the cutting edge-replaceable endmill 10 according to the present embodiment adopts the negative type insert in which the upper and lower surfaces 50 and 52 are at right angles to the circumferential side surface 54. Thus, compared to an insert of a positive type in which an upper surface and a lower surface cross a side surface at an acute angle, the cutting insert 14 is excellent in the strength of the insert itself. Since the cutting insert 14 is constructed as described above, the seat surface 64, serving as a mounting surface mounted on the endmill body 12, can have a large area. Hence, the cutting insert 14 is excellent in mounting stability.

Furthermore, the cutting insert 14 is provided with chamfered portions 70 along the marginal ridge portion of the abutting surface 68 thereof. Thus, during mounting and cutting of the cutting insert 14, the cutting insert 14 is prevented from being damaged by, for example, the contact of the marginal ridge portions of the abutting surface 68 with the respective wall surfaces of the insert mounting seat 16. This eliminates the need to carry out undercutting on a corner portion at which the bottom wall surface 24 and side wall surface 26 of the insert mounting seat 16 cross and a corner portion at which the upper wall surface 34 and side wall surface 26 of the insert mounting seat 16 cross in order to prevent damage to the cutting insert 14 by contact with the marginal ridge portions of the abutting surface 68 and the insert mounting seat 16 or the upper wall portion 18. Hence, the insert mounting seat 16 can be easily machined exclusively from a tool diameter direction orthogonal to the axis A. Consequently, in machining the insert mounting seat, interference with machining of the chip pocket also need not be taken into account. Thus, the endmill body 12 can be easily manufactured and is suitable for mass production, and can be provided in a short time and at a low cost. Moreover, the chamfered portions 70 are provided on the abutting surface 68 arranged on the outer circumferential side of head of endmill body 12, and this allows the cutting insert 14 and the endmill body 12 to be prevented from being damaged by, for example, biting chips.

Additionally, the chip breaker or the like is provided on the rake face 58 of the cutting insert 14, and thus even if the cutting insert 14 is mounted on the endmill body 12 such that the axial rake angle is negative, cutting resistance can be reduced.

The cutting edge-replaceable endmill 10 according to the embodiment of the present invention has been described. However, various changes may be made to the cutting edge-replaceable endmill 10. For example, in the above-described cutting edge-replaceable endmill 10, the cutting insert 14 is mechanically mounted on the endmill body using the mounting screw, but the cutting insert 14 may be mechanically mounted on the endmill body 12 using another mechanical means. Furthermore, the present invention does not exclude chemical mounting of the cutting insert on the tool body using chemical means.

Additionally, for example, the shape of the upper wall surface 34 of the upper wall portion 18 is not particularly limited, and the upper wall surface 34 may have some other shape. The amount h of overhang of the upper wall portion 18 can be appropriately set. Substantially preferably, the overhang amount h1 on the tool leading end side is set relatively small, whereas the overhang amount h2 on the tool base end side is set larger than the overhang amount h1. However, the overhang amount on the tool leading end side may be the same as the overhang amount on the tool base end side. For example, the overhang amount on the base end side of the upper wall portion 18 may be equal to or greater than half of the width of the bottom wall surface 24. Furthermore, for example, the overhang amount on the leading end side of the upper wall portion 18 may be equal to or smaller than half of the width of the bottom wall surface 24.

In addition, in the above-described embodiment, the upper wall portion 18 overhanging the insert mounting seat 16 covers a part of the insert 14 mounted on the insert mounting seat 16. However, it is possible that the upper wall portion 18 does not cover any part of the insert 14 mounted on the insert mounting seat 16. Even in such a case, the upper wall portion 18 overhangs the insert mounting seat to contribute to increasing the thickness of the back metal by an amount equal to the amount of overhang of the upper wall portion 18.

Furthermore, the cutting edge-replaceable endmill 10 adopts the following pressing mechanism. The setscrew hole 36 is formed in the upper wall portion 18 of the endmill body 12. The engagement hole 66 is formed in the cutting insert 14. The setscrew 38 is then used to press the cutting insert 14 against the insert mounting seat 16. However, the present invention is not limited to this mechanism. The pressing mechanism need not be adopted. Additionally, another pressing mechanism may be used instead of the pressing mechanism using the setscrew 38.

Additionally, the shape of the side surface of the upper wall portion 18 is not particularly limited to that of the side surface 20 of the cutting edge-replaceable endmill 10 according to the above-described embodiment. A shape other than that of the side surface 20 may be adopted as the shape of the side surface of the upper wall portion 18.

In addition, in the cutting edge-replaceable endmill 10, the endmill body 12 is provided with the through-hole 22 through which a cutting fluid or the like is ejected, in order to remove chips and cool the cutting edge and a cutting area. However, the present invention is not limited to this aspect. For example, a cutting fluid or the like may be provided from outside the endmill body 12 with no through-hole formed in the endmill body 12.

Furthermore, the above-described embodiment adopts the negative type insert in which the upper and lower surfaces are at right angles to the side surface and having a generally rectangular tabular shape. However, alternatively, an insert of a positive type may be adopted in which an upper surface and a lower surface cross a side surface at an acute angle. Alternatively, an insert formed of a planar plate shaped like a polygon such as a triangle, a rectangular, a pentagon, or a hexagon may be adopted.

Additionally, in the above-described embodiment, the engagement holes 66 are formed close to the respective corners of each of the upper and lower surfaces of the cutting insert 14. However, the positions, number or the like of the engagement holes 66 is not particularly limited. In addition, the shape of the engagement hole 66 is not particularly limited. For example, if round point screws are used, generally hemispherical engagement holes may be adopted instead of the engagement holes shaped like generally circular truncated cones.

In addition, in the insert 14 according to the above-described embodiment, the chamfered portions 70 formed with planar chamfered surfaces are provided by chamfering the marginal ridge portion of the abutting surface 64 of the cutting insert 14 at 45 degrees. However, the cutting insert according to the present invention is not limited to this aspect. Alternatively, the chamfered portion may be a chamfered portion formed of a generally circular chamfered surface. Alternatively, such chamfering may be omitted. If chamfering is carried out, the width of the chamfered surface is preferably set within the range of 0.2 mm or larger and 1.0 mm or smaller. A chamfered surface width of smaller than 0.2 mm may prevent expected effects from being exerted. A chamfered surface width of larger than 1.0 mm may reduce the area of the abutting contact surface 68 and thus the mounting rigidity of the insert.

Additionally, in the above-described embodiment, the chip breaker or the like is provided on the rake face 58 of the cutting insert 14. However, alternatively, the chip breaker or the like may be omitted from the cutting insert.

Figure 7:
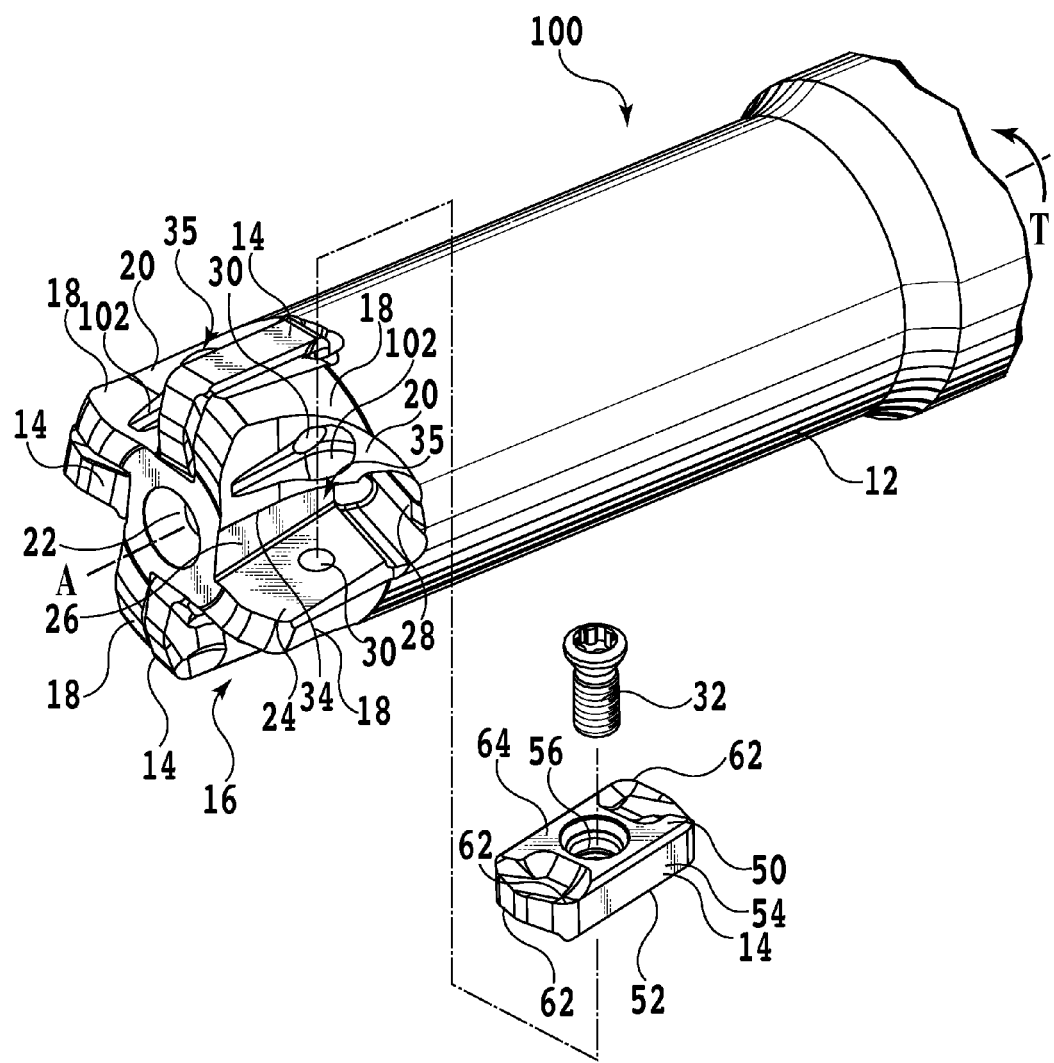
FIG. 7 is an exploded perspective view showing the structure of a leading end of a cutting edge-replaceable endmill according to another embodiment of the present invention.

Now, a cutting edge-replaceable endmill 100 according to another embodiment of the present invention which is constructed differently from the cutting edge-replaceable endmill 10 will be described based on FIG. 7 to FIG. 9. Mainly the differences between the cutting edge-replaceable endmill 100 and the cutting edge-replaceable endmill 10 will be described. However, in the description below, components of the cutting edge-replaceable endmill 100 which are the same as those of the cutting edge-replaceable endmill 10 are denoted by the same reference numerals, and duplicate descriptions of these components are omitted. Such changes as described for the cutting edge-replaceable endmill 10 may be applied to the cutting edge-replaceable endmill 100 as in the case of the cutting edge-replaceable endmill 10 to the extent that there are no inconsistencies in the resultant structure. The cutting edge-replaceable endmill 100 to which such changes have been applied can exert effects similar to those of the cutting edge-replaceable endmill 10.

Figure 8:
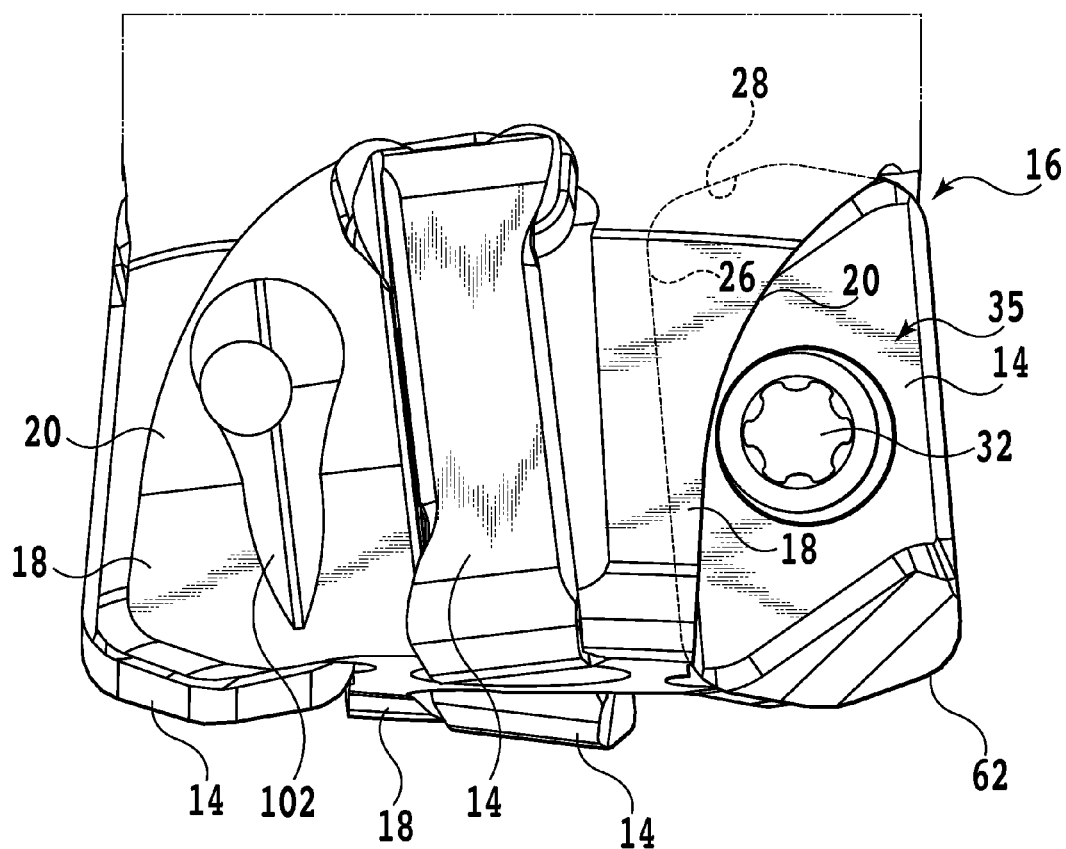
FIG. 8 is a plan view showing the leading end of the cutting edge-replaceable endmill in FIG. 7 with a cutting insert mounted thereon.
Figure 9:
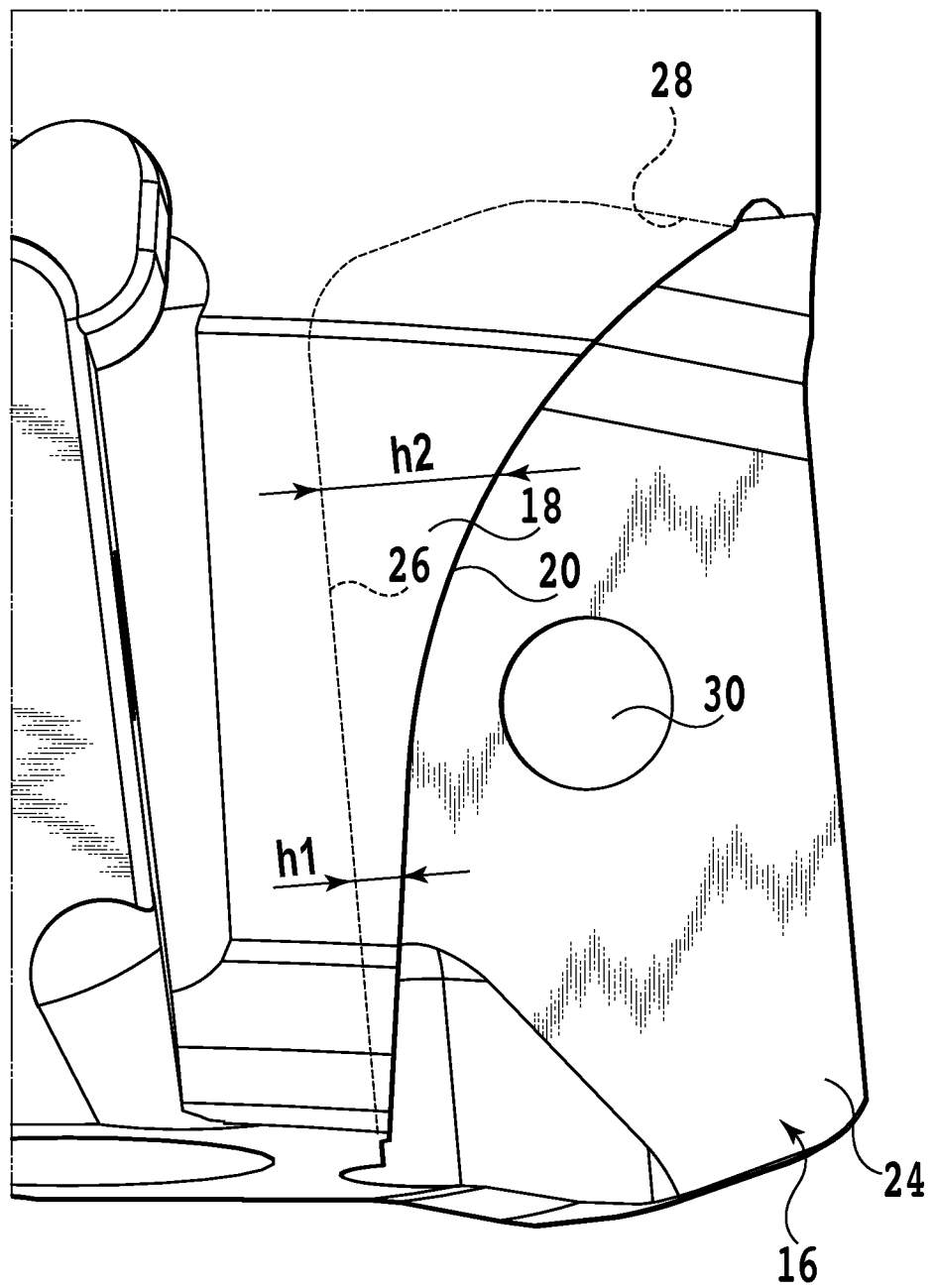
FIG. 9 is an enlarged view of a part of the leading end of the cutting edge-replaceable endmill in FIG. 7.

As shown in FIG. 8 and FIG. 9, in the cutting edge-replaceable endmill 100, the upper wall portion 18 is formed such that the amount h of overhang of the upper wall portion 18 increases progressively from the leading end side to base end side of the insert mounting seat 16. In this case, a large space is provided on the tool leading end side, making the cutting edge-replaceable endmill 100 excellent in allowing chips to be disposed of.

Furthermore, unlike the cutting edge-replaceable endmill 10, the cutting edge-replaceable endmill 100 avoids adopting the pressing mechanism for pressing the cutting insert 14 against the insert mounting seat 16 using the setscrew 38. That is, in the cutting edge-replaceable endmill 100, the endmill body 12 does not include the setscrew hole 36, and the cutting insert 14 does not include the engagement hole 66. Compared to the cutting edge-replaceable endmill adopting the pressing mechanism, the cutting edge-replaceable endmill 100 increases the degree of freedom for design of the chip pocket and the breaker shape. This further enables a reduction in the manufacturing cost of the endmill 100, resulting in the endmill 100 with low costs.

Additionally, as more clearly shown in FIG. 8, in the cutting edge-replaceable endmill 100, the shape of the upper wall portion 18 is defined such that the chip pocket 35 has a large volume enough to prevent the head portion 32*h* of the mounting screw 32 from coming into contact with the wall surface 20 during operation of the mounting screw 32. Thus, the upper wall portion 18 of the cutting edge-replaceable endmill 100 does not include the recess portion 20*r*. However, as shown in FIG. 7, the upper wall portion 18 includes the recess portion 102 on the side surface 20 thereof. The recess portion 102 allows an increase in the amount of overhang of the upper wall portion 18 and thus in the thickness of the back metal to improve the strength of the tool head, while allowing an increase in the volume of the chip pocket 35. Therefore, the cutting edge-replaceable endmill 100 has excellent characteristic for disposing of chips.

The cutting edge-replaceable cutting tool and the cutting insert for use therein according to the present invention have been described taking the cutting edge-replaceable endmill and the cutting insert for use therein as an example. However, for example, the present invention is applicable to, besides the endmill, which is a rotatable tool, other cutting edge-replaceable rotatable tools such as a milling cutter, a reamer, a drill, or a boring cutter. The present invention is also applicable to cutting edge-replaceable cutting tools that are used by rotating a workpiece with a tool such as a boring tool fixed.

The above-described embodiments and modifications thereof have been described with a certain degree of specificity. However, the present invention is not limited to the above-described embodiments and modifications. It should be appreciated that various alterations or changes may be made to the present invention without departing from the spirits and scopes of the invention set forth in the claims. That is, the present invention includes any modifications, applications, and equivalents embraced by the concepts of the present invention defined by the claims.

What is claimed is:

1. A cutting edge-replaceable cutting tool comprising a tool body having an axis extending from a leading end side to a base end side thereof and a plurality of cutting inserts removably installed thereon, the cutting tool comprising:
   a plurality of insert mounting seats formed on the tool body, each insert mounting seat having a screw hole provided therein; and
   a plurality of upper wall portions formed integrally with the tool body, each of the plurality of upper wall portions overhanging a corresponding insert mounting seat of the plurality of insert mounting seats;
   wherein in each of the plurality of the upper wall portions, the insert mounting seat adjacent to the corresponding insert mounting seat is formed;
   each of the plurality of upper wall portions overhangs so as to cover at least a part of the cutting insert when the cutting insert is mounted on the corresponding insert mounting seat, and is formed so as to increase a thickness of a portion for supporting the cutting insert with respect to the insert mounting seat adjacent to the corresponding insert mounting seat;
   each of the plurality of the upper wall portions is formed such that an amount by which the upper wall portion overhangs the insert mounting seat on a base end side thereof is larger than an amount by which the upper wall portion overhangs the insert mounting seat on a leading end side thereof; and each cutting insert has a mounting hole passing therethrough, and is mounted on the corresponding insert mounting seat by a mounting screw passing through the mounting hole and screwed into the screw hole.

2. A cutting edge-replaceable cutting tool according to claim 1, wherein each of the plurality of the upper wall portions is shaped so as not to hinder screwing of the mounting screw into the screw hole.

3. A cutting edge-replaceable cutting tool according to claim 2, wherein
a leading end in each of the plurality of the upper wall portions is formed so as to overhang by a substantially constant overhang amount, and a base end in each of the plurality of the upper wall portions is formed so that a overhang amount thereof increases progressively from the leading end side toward the base end side.

4. A cutting edge-replaceable cutting tool according to claim 1, wherein
each of the plurality of the insert mounting seats comprises a bottom wall surface, and a side wall surface and a end wall surface both extending to be at a right angle to the bottom wall surface, and
in each of the plurality of the insert mounting seats, a upper wall surface extending to be at a right angle to both the side wall surface and the end wall surface and opposite the bottom wall surface is formed in the corresponding upper wall portion.

5. A cutting edge-replaceable cutting tool according to claim 1, wherein
each of the plurality of the upper wall portions comprises a setscrew hole formed to penetrate the upper wall portion toward the corresponding insert mounting seat, and
wherein in any insert mounting seat, when the cutting insert is mounted on the insert mounting seat, a setscrew is screwed into the setscrew hole such that the cutting insert is pressed against the insert mounting seat.

6. A milling tool body having an axis of rotation defining a forward to rear direction, a leading end and a base end, the tool body further comprising:
a plurality of insert mounting seats formed at the leading end along a periphery of the tool body, each insert mounting seat having a side wall surface, a bottom wall surface and an upper wall surface facing the bottom wall surface, the upper wall surface and the bottom wall surface being spaced apart by a height sufficient to accommodate a thickness of a cutting insert mountable in said insert mounting seat;
a plurality of upper wall portions formed integrally with the tool body and having unitary one-piece construction therewith; wherein:
each upper wall portion overhangs a corresponding insert mounting seat, has a lower side on which is formed the upper wall surface of said corresponding insert mounting seat, and further has an upper side on which is formed the bottom wall surface of an insert mounting seat adjacent to said corresponding insert mounting seat; and
the upper wall surface formed on the lower side of said each upper wall portion and the bottom wall surface formed on the upper side of said each upper wall portion face in circumferentially opposite directions,
wherein:
a screw hole is formed in each of the plurality of insert mounting seats;
each upper wall portion has a first section which is between the leading end and the screw hole, the first section overhanging the corresponding insert mounting seat by a substantially constant overhang amount along the rearward direction of the tool body; and
said each upper wall portion has a second section which is between the screw hole and a base end side of the corresponding insert mounting seat, the second section overhanging the corresponding insert mounting seat by a progressively increasing overhang amount along the rearward direction of the tool body.

7. The milling tool body according to claim 6, wherein:
each upper wall portion has a side surface extending along a rearward direction of tool body; and
a recess is formed in the side surface of said upper wall portion at a location along the rearward direction, which location is aligned with the screw hole formed in the corresponding insert mounting seat.

8. The milling tool body according to claim 6, wherein:
each upper wall portion is penetrated by a setscrew hole which passes through the upper wall surface.

9. The milling tool body according to claim 6, wherein:
in each insert mounting seat, the side wall surface is at a right angle to both the bottom wall surface and the upper wall surface.

10. A milling tool comprising:
a milling tool body having an axis of rotation defining a forward to rear direction, a leading end and a base end, and further comprising:
a plurality of insert mounting seats formed at the leading end along a periphery of the tool body, each insert mounting seat having a side wall surface, a bottom wall surface and an upper wall surface facing the bottom wall surface, the upper wall surface and the bottom wall surface being spaced apart by a height sufficient to accommodate a thickness of a cutting insert mountable in said insert mounting seat;
a plurality of upper wall portions formed integrally with the tool body and having unitary one-piece construction therewith; wherein:
each upper wall portion overhangs a corresponding insert mounting seat, has a lower side on which is formed the upper wall surface of said corresponding insert mounting seat, and further has an upper side on which is formed the bottom wall surface of an insert mounting seat adjacent to said corresponding insert mounting seat; and
the upper wall surface formed on the lower side of said each upper wall portion and the bottom wall surface formed on the upper side of said each upper wall portion face in circumferentially opposite directions; and
a cutting insert mounted in each insert mounting seat;
wherein:
each upper wall portion overhangs a corresponding cutting insert;
a screw hole is formed in each of the plurality of insert mounting seats; and
a mounting screw passes through a mounting hole in the cutting insert and is screwed into the screw hole to mount the cutting insert,
wherein:
each upper wall portion is penetrated by a setscrew hole which passes through the upper wall surface; and
a setscrew is screwed into the setscrew hole such that the cutting insert is pressed against that corresponding insert mounting seat; and
the mounting screw and the set screw both press the cutting insert, at spaced apart locations and in a common direction, against the corresponding insert mounting seat.

11. The milling tool according to claim 10, wherein:
each upper wall portion has a side surface extending along a rearward direction of tool body; and
a recess is formed in the side surface of said upper wall portion at a location along the rearward direction, which location is aligned with the mounting screw screwed into the screw hole so as not to hinder access to the mounting screw.

12. A cutting edge-replaceable cutting tool according to claim 1, wherein:
each of the upper wall portions is shaped such that the mounting screw is screwed into the screw hole without passing through the upper wall portion; and
the amount by which the upper wall portion overhangs the insert mounting seat increases gradually from a central portion thereof proximate the screw hole in a direction of the base end side, with the upper wall portion extending circumferentially outward of the screw hole.

* * * * *